May 26, 1931. J. GRAFMILLER 1,806,875
HAY LOADER
Filed March 15, 1930 4 Sheets-Sheet 1
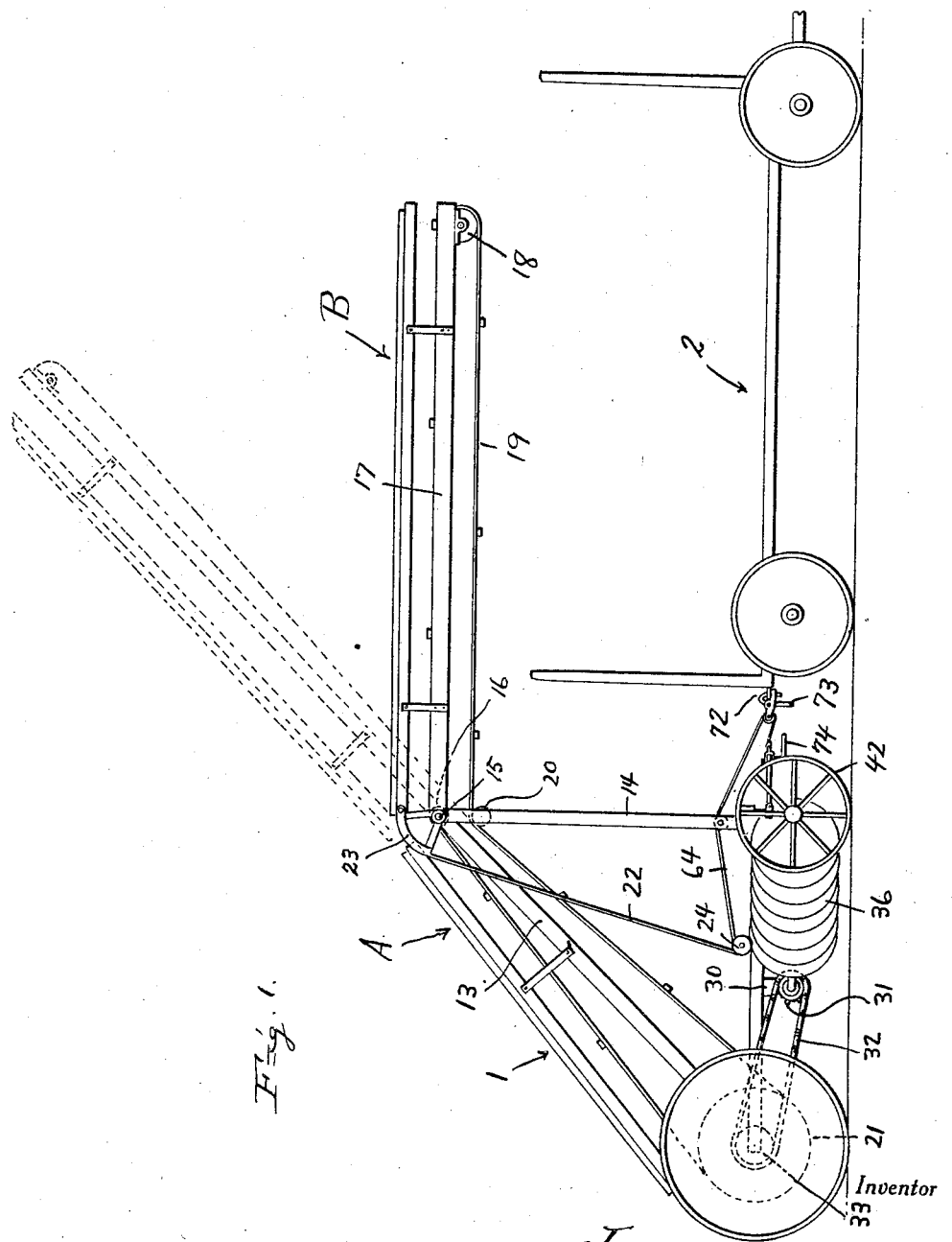
Inventor
James Grafmiller
By Clarence A. O'Brien
Attorney

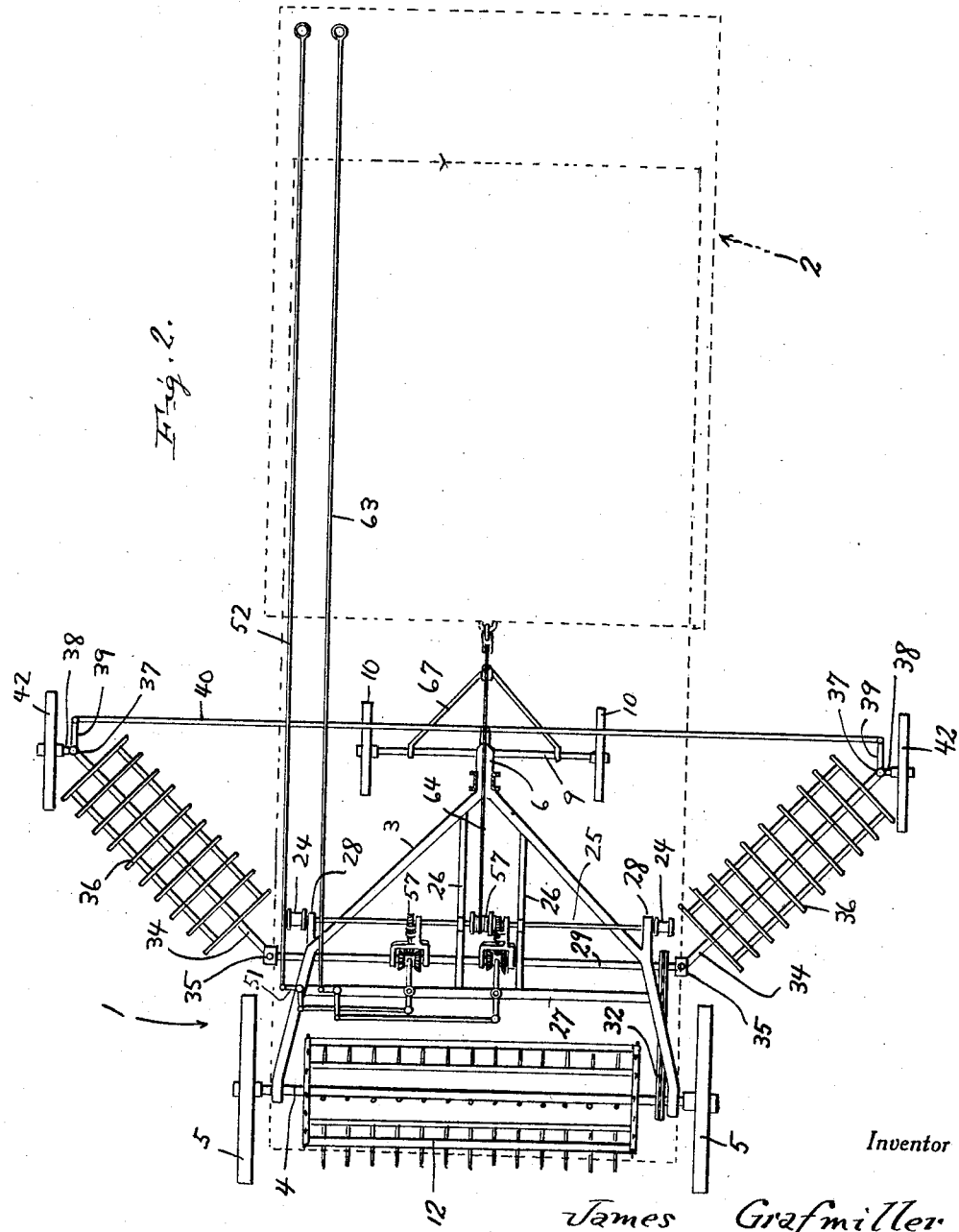

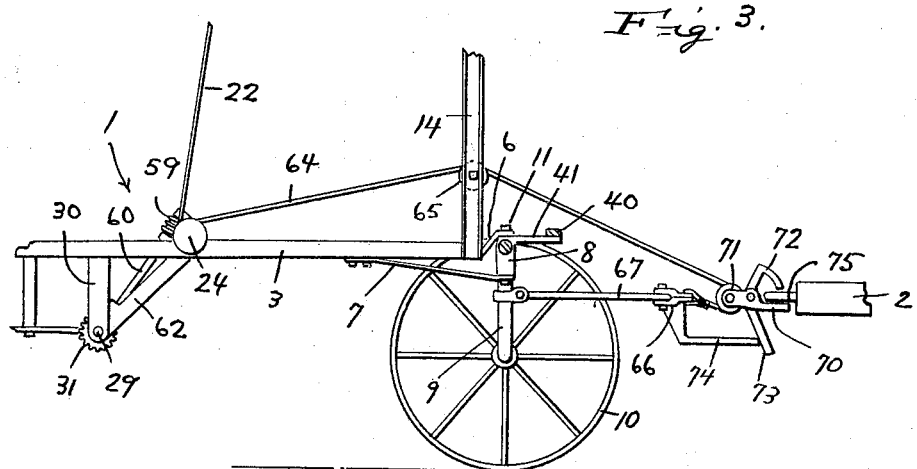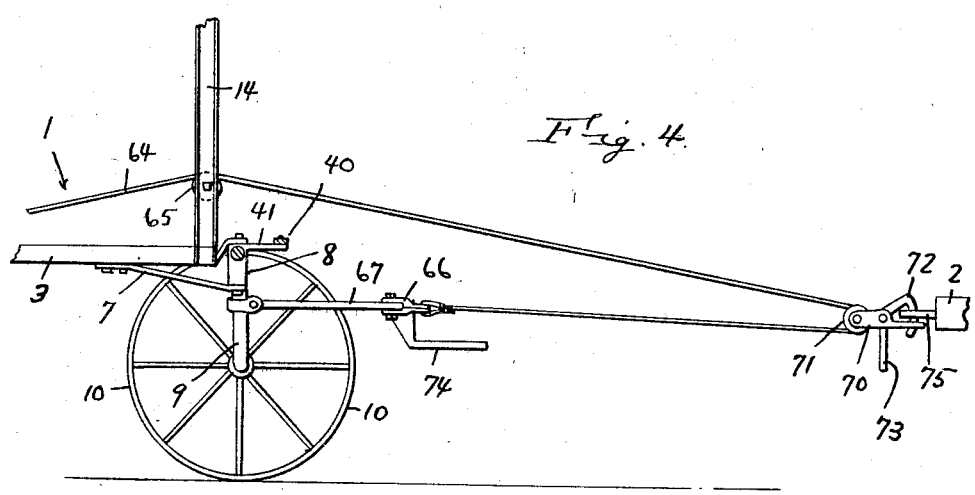

May 26, 1931.  J. GRAFMILLER  1,806,875
HAY LOADER
Filed March 15, 1930  4 Sheets-Sheet 4
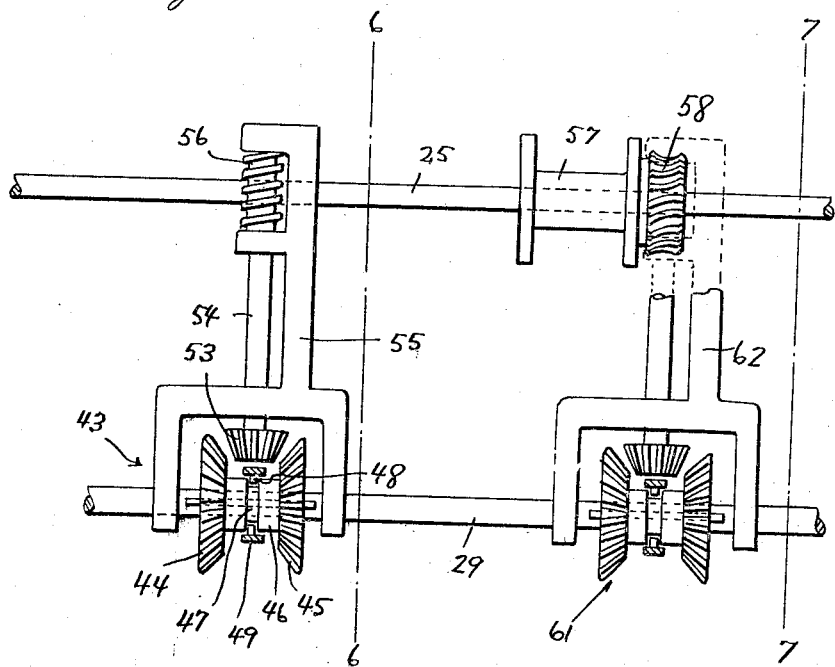
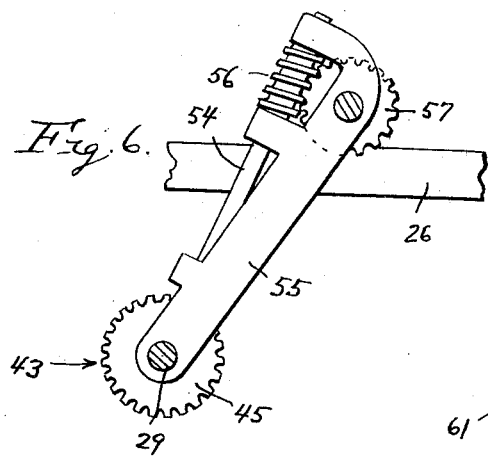
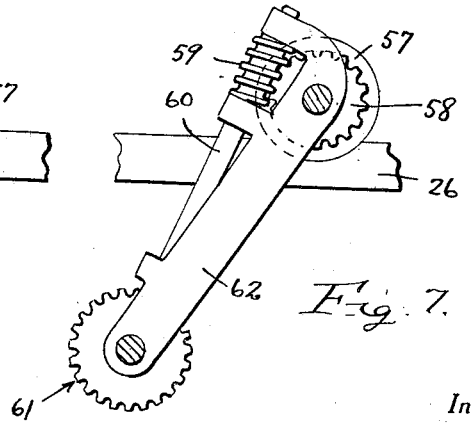
Inventor
James Grafmiller
By Clarence A. O'Brien
Attorney Patented May 26, 1931

1,806,875

UNITED STATES PATENT OFFICE

JAMES GRAFMILLER, OF FOREST, OHIO

HAY LOADER

Application filed March 15, 1930. Serial No. 436,116.

This invention relates to new and useful improvements in hay loaders and more particularly to devices of this character of the type which are attached behind and drawn by the hay rack on vehicles to be loaded.

The primary object of the invention is to provide, in a manner as hereinafter set forth, a hay loader of the aforementioned character embodying a construction and arrangement of parts which will insure the uniform loading of the vehicle at all points therein, thus eliminating the necessity of hand labor in distributing the hay evenly over the vehicle as same is deposited therein by the loader.

Another important object of the invention is to provide a hay loader of the character set forth which is adapted to load the forward portion of the vehicle first and then move progressively toward the rear thereof.

A further important object of the invention is to provide, in a manner as hereinafter set forth, a hay loader embodying an endless loading conveyor having a vertically swingable upper section and further embodying manually controlled power actuating means for adjusting said swingable section to any desired point.

A still further important object of the invention is to provide, a hay loader embodying means for automatically uncoupling the same from the loaded vehicle when it is so desired, said means being manually controlled.

Still further objects of the invention are to provide a hay loader of the character set forth which will be simple in construction, strong, durable, efficient in its use and which may be manufactured at low cost.

Another very important object of the invention is to provide, in a manner as hereinafter set forth, a hay loader of the aforementioned character including a main rotary rake and a pair of forwardly diverging side rakes mounted for operation forwardly of said main rake in a manner to move the hay on the ground over which the machine is traveling inwardly from the opposite side of said machine into the path of the main rake to be moved thereby on to the loading conveyor.

All of the foregoing and still further objects and advantages of the invention may become apparent from a study of the following specification, taken in connection with the accompanying drawings, wherein like characters of reference designate corresponding parts throughout the several views, and wherein:—

Figure 1 is a view in side elevation of a hay loader constructed in accordance with this invention, the same being shown connected in operative position to the vehicle to be loaded.

Figure 2 is a view in top plan of the machine with the loading conveyor removed therefrom.

Figure 3 is an enlarged detail view in side elevation illustrating the manner in which the hay loader is uncoupled from the vehicle to which the same is attached.

Figure 4 is a view in side elevation showing the hay loader coupled to the vehicle, a fragment of the rear end portion only of said vehicle being shown and the forward portion only of the loader being shown.

Figure 5 is an enlarged detail view showing the mechanism for controlling the swingable section of the loading conveyor and for regulating the distance of the hay loader behind the vehicle to be loaded.

Figure 6 is a view taken substantially on the line 6—6 of Figure 5.

Figure 7 is a view taken substantially on the line 7—7 of Figure 5.

Referring to the drawings in detail, it will be seen that the reference numeral 1 designates generally the hay loader constituting this invention and 2 designates the vehicle to be loaded and to which the hay loader is attached. As illustrated to advantage in Figure 2 of the drawings, the loader comprises a substantially V-shaped frame 3 the diverging arm portions of which are mounted, at their rear end portions, on the rotatable axle 4 having wheels 5 fixed on its opposite end portion.

At its forward end the frame 3 is provided with an extension 6 which, as best seen in Figures 3 and 4 of the drawings, is provided with a vertically offset end portion. A bar 7 is connected at its rear end to the frame 3 and extends forwardly and downwardly therefrom and terminates in the vertical plane of the extension 6. A vertically disposed sleeve 8 is formed in the intermediate portion of a swingable front axle 9 which is provided with downwardly offset spindle portions at its opposite end upon which are mounted for rotation the front wheels 10. The sleeve 8 is preferably formed integrally with the axle 9 and is mounted for rotation between the free end portions of the extension 6 and the bar 7 through the medium of the spindle bolts 11.

A rotary rake 12 is fixed on the axle 4 for rotation therewith. An endless conveyor frame 13 has its lower end supported on the frame 3 in any suitable manner. It may be well to here state that the endless conveyor comprises a lower stationary section which is designated generally by the reference character A of which the frame portion 13 forms a part and a vertically swingable upper section which is designated generally by the reference character B. The upper end of the frame section 13 is rigidly mounted and supported on the upper end of a pair of vertically disposed standards 14 which extend upwardly in diverging relation with respect to each other from the forward end of the frame 3 and have mounted between their upper end portions a horizontal bar 15. A sleeve roller 16 is mounted for rotation on the bar 15 between the upper ends of the standards 14. The supporting frame 17 of the swingable section B of the endless conveyor has its rear end mounted for swinging movement on the bar 15 and said frame section has journaled at its free end portion a roller 18 over which is trained the endless conveyor belt 19, the lower flight of the belt 19 travels over a roller 20 mounted for rotation between the standards 14 and said belt then passes downwardly and is trained on a driving drum or sprocket 20 which is fixed on the axle 4. It may be here stated that the construction and arrangement of the lower end of the conveyor section A, the driving drum or sprocket 20 and the main rake 12 is conventional in hay loaders now in use, such as the John Deere hay loader. In this particular type of machine the loading conveyor comprises a pair of endless sprocket chains between which extends parallel, spaced slats, and said sprocket chains are trained over a pair of comparatively large sprockets fixed on the axle adjacent the opposite end of the main rake. While the conveyor 19 has been herein referred to as a belt, it is to be understood that the same may be in any suitable form such as a pair of sprocket chains with transverse slats therebetween. From the drum or sprocket 20 the conveyor 19 travels upwardly over the roller 15. It is also understood that if a conveyor of the chain and slat type is used, sprocket wheels will be substituted for the rollers 15, 16 and 18. A pair of cables 22 are connected to the opposite side of the supporting frame 17 of the conveyor section B at the rear end thereof through the medium of the segmental frame members 23 and in such manner that a downward pull on said cable will swing said conveyor section upwardly to the position indicated in dotted lines in Figure 1 of the drawings. The cables 22 are windable on the drums 24 (see Figure 2) which are fixed on the opposite end portion of a transverse horizontally disposed shaft 25 which, in turn, is mounted for rotation on the spaced, parallel longitudinally extending bars 26 which have their forward ends supported on the diverging arms of the frame 3 adjacent the forward ends thereof and their opposite ends mounted on a transverse beam 27 which has its opposite end supported on the diverging portion of said frame 3. The bars 26 and the beam 27 constitute a part of the frame 3 and serves to lend rigidity thereto. The opposite end portions of the shaft 25 are also supported for rotation in the extension 28 which projects forwardly from the frame 3 as also best seen in Figure 2 of the drawings.

A power shaft 29 is mounted for rotation in the lower end portion of the supporting bracket 30 (see Figure 1) which depend from the frame 3 and said power shaft has fixed thereon adjacent one end a sprocket wheel 31 over which is trained a driving chain 32 which in turn is trained over a sprocket 33 fixed on one end portion of the axle 4. A pair of horizontally disposed forwardly diverging shafts 34 are operatively connected to the opposite end of the power shaft 29 for rotation therewith and actuation thereby through the medium of the universal joint 35 and each of said shafts has mounted thereon for rotation therewith a side rake 36. The forward ends of the shaft 34 are rotatably connected to vertically disposed stationary shafts 37 which are tubular in form. Stub axles 38 are fixed on the lower ends of the shafts which extend for rotation through the tubular member 37 and have fixed on their upper ends the arms 39 to the free ends of which are connected the opposite ends of a transversely extending coupling bar 40. The intermediate portion of the bar 40 is operatively connected to a forwardly projecting arm 41 formed integrally with the sleeve 8 for actuation thereby. Thus upon swinging movement of the front axle 9, the wheels 42 which support the rake 36 will be swung from side to side.

The shaft 25 is operatively connected to the power shaft 29 through the medium of a reversible gear unit best seen in Figure 5 of the drawings and designated generally by the reference numeral 43. This unit comprises a pair of connected opposed beveled gears 44 and 45 mounted on the opposite end of a sleeve 46 which, in turn, is keyed for longitudinal movement on the shaft 29 and is provided with a circumferential groove or channel 47 for receiving the inwardly projecting pins 48 mounted on the forks of a lever 49 which is pivotally mounted on the beam 27. The lever 49 is operatively connected through a link 50 to one end of a bell crank 51 which is mounted for swinging movement on the frame 3 and an actuating rod 52 is operatively connected to the opposite end of said bell crank lever. The rod 52 extends forwardly to a point at the forward end of the vehicle 2 for convenient actuation by an operator. The gears 44 and 45 are adapted to be selectively engaged with a beveled gear 53 fixed on one end portion of a rotatable shaft 54 which is mounted for rotation in a supporting frame 55 which is loosely mounted at its opposite end on the shafts 25 and 29 in a manner to permit rotation of said shafts. On its opposite end the shaft 54 has fixed thereon a worm gear 56 which is operatively engaged with a gear 57 fixed on the shaft 25. It will thus be seen that, through the medium of the rod 52, the shafts 25 may be rotated in either direction to wind or unwind the cable 22 on the drum 24 and raise and lower the upper section B of the conveyor.

A drum 57 is loosely mounted for rotation on the shaft 25, and, as also best seen in Figure 5 of the drawings, said drum has fixed on one end thereof a gear 58 which is driven by a worm gear 59 (see Figure 7) which is fixed on the upper end portion of a shaft 60 which, in turn, is operatively connected to the power shaft 29 through the medium of a reversing gear unit designated generally by the reference numeral 61, and which is identical in construction to the unit 43. The frame which supports the shaft 60 is designated by the reference numeral 62. The frame 55 and the frame 62 are retained against longitudinal movement on the shafts 25 and 29 by any suitable means. The frame 62 is further rotatably connected to the drum 57 and gear 58 in a manner to prevent separation of said drum with the gear thereon from the frame. If desired, the frames 55 and 62 may be mounted on the shafts 25 and 29 in any suitable manner to prevent longitudinal movement of said frames on said shafts but so that the shafts may rotate therein, as by coacting, interfitting circular ribs and grooves on the frames and shafts. The gear unit 61 is operatively connected for actuation to an elongated rod 63 in the same manner in which the rod 52 is connected to the gear unit 43. A cable 64 is windable on the drum 57 and, as best seen in Figures 3 and 4 of the drawings, said cable extends over a roller 65 journaled between the standards 14 adjacent the lower ends thereof and has its free end connected to a clevis 66 which is mounted on the intermediate portion of a substantially V-shaped bar 67 which, as best seen in Figure 2, is hingedly connected, at its opposite end, to the swinging front axle 9. A bifurcated casting 70 is mounted on the cable 64 through the medium of a pulley 71 journaled for rotation between the furcation of said casting. The forward end of the casting is provided with an opening for the reception of a coupling hook 72 which is pivotally supported on the casting and provided with an integral depending arm 73 with which is engageable a projection 74 which extends forwardly from the clevis 66. The coupling hook 72 is adapted to engage in an apertured plate 75 which projects from the rear end of the vehicle 2. The plate 75, if desired, may be in the form of a yoke or an eye bolt.

In use, the loader 1 is attached to the vehicle closely adjacent to the rear end thereof and when said vehicle is drawn over the ground, the side rakes 36 sweep the hay inwardly in the path of the main rake 12 and said main rake deposits the hay on the endless conveyor in the usual manner. With the upper section of the conveyor in the position illustrated in full lines in Figure 1 of the drawings, the hay will be deposited on the forward end portion of the vehicle 2 and as said forward end portion becomes loaded the operator, through the medium of the rod 63 and the gear unit 61 rotates the drum 57 in a manner to unwind the cable and permit the loader to recede from the vehicle. In this manner the vehicle is loaded uniformly throughout its length, as will be obvious. As the vehicle becomes loaded, the operator is enabled to shift the upper section B of the conveyor through the medium of the rod 52, the gear unit 43 which rotates the drum 24 through the medium of the shaft 25 and winds the cable 22 thereon. When it is desired to uncouple the hay loader from the vehicle, this is accomplished by shifting the gear unit 61 in a manner to wind the cable 64 on the drum 57 and draw the hay loader forwardly with respect to the vehicle until the projection 74 engages the extension 73 to raise the hook 72 from the coupling member 75. It is understood, of course, that the uncoupling operation is accomplished while the vehicle and hay loader are traveling forwardly. It is further understood that the device may be used without the side rakes if desired.

It is believed that the many advantages of a hay loader constructed in accordance with this invention will be readily understood, and although the preferred embodiment of the invention is as illustrated and described, it is to be understood that changes in the details of construction may be had which will fall within the scope of the invention as claimed.

What is claimed is:—

A hay loader of the character described comprising a wheeled mobile frame having an endless conveyor mounted for operation thereon and adapted to deposit hay in a vehicle disposed forwardly of the loader, and means for detachably connecting the loader to the vehicle comprising a cable having one end attached the loader, a drum mounted for rotation on the loader upon which the cable is windable, a casting having a hook thereon engageable with the vehicle to be loaded, a pulley journaled in the casting over which the cable is trained, an actuating arm depending from the hook and a projection depending forwardly from the loader for engagement with the arm in a manner to shift the hook.

In testimony whereof I affix my signature.

JAMES GRAFMILLER.